C. DANIEL.
Wagon Attachment.
No. 110,209. Patented Dec. 20, 1870.
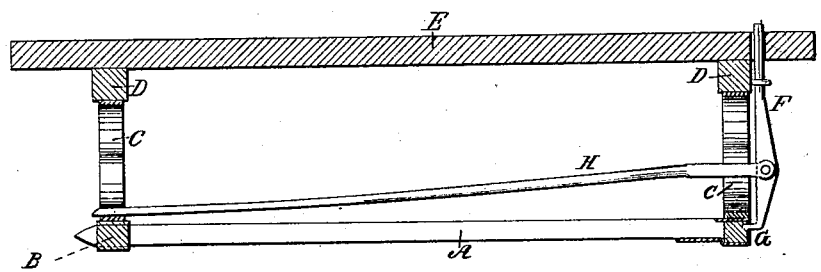
Witnesses:
A. Bennerendorf
L. S. Mabee
Inventor:
C. Daniel
per Munn & Co
Atty's

United States Patent Office.

CHARLES DANIEL, OF BROWNSVILLE, MISSOURI.

Letters Patent No. 110,209, dated December 20, 1870.

IMPROVEMENT IN VEHICLES.

The Schedule referred to in these Letters Patent and making part of the same.

*To all whom it may concern:*

Be it known that I, CHARLES DANIEL, of Brownsville, in the county of Saline and State of Missouri, have invented a new and useful Improvement in Vehicles; and I do hereby declare that the following is a full, clear, and exact description thereof, which will enable others skilled in the art to make and use the same, reference being had to the accompanying drawing forming part of this specification, in which—

The figure is a longitudinal sectional view of the reach, springs, and body-bottom of a wagon to which my improvement has been attached.

My invention has for its object to furnish an improved device for attachment to spring wagons, buggies and other vehicles, to prevent the pitching forward of the vehicle, and the consequent strain, jamming, or breakage of the springs or couplings, and It consists in the construction of the pivoted upright and brace-rod, as hereinafter more fully described.

A is the reach;

B are the lower spring-bars;

C are the springs;

D are the upper spring-bars; and

E is the body-bottom, about the construction of which parts there is nothing new.

F is an upright bar, upon the lower end of which is formed a pivot, G, which enters and works in a hole or socket in the forward side of the front lower spring-bar B.

The upright F extends up along the front of the forward springs C, and upper front spring-bar D. In the case of vehicles in which the body extends in front of the springs, the upper end of the upright F may pass up through the body-bottom, as shown in the figure.

In the case of vehicles in which the body does not extend in front of the forward springs, the upper end of the upright F may pass through and work in a staple or keeper attached to the forward side of the upper forward spring-bar D, as shown in the figure.

To the upright F is pivoted the forward end of the brace-rod H, the rear end of which may be bolted to the lower rear spring-bar, as shown in the figure, to the rear axle, or to the reach A, as may be desired or convenient. I prefer to bolt it to the rear lower spring-bar or rear axle, especially in the case of heavy vehicles.

This device allows the body of the vehicle to rock freely, or have a free lateral movement, but wholly prevents the forward pitching of said body.

Having thus described my invention,

I claim as new and desire to secure by Letters Patent—

The improved device herein described for preventing the swaying of wagon-bodies, consisting of the rod H, secured at its rear end, in connection with one of the springs, and pivoted at its front end to the upright bar F, which is pivoted at G, and arranged to work freely at its upper end, as shown and described.

CHARLES DANIEL.

Witnesses:
J. L. FERGUSON,
D. L. SMITH.